Sept. 8, 1970    H. J. HOFFMAN    3,527,056
FLOW POSITIONED INJECTOR
Filed Nov. 20, 1967    2 Sheets-Sheet 1

Herbert J. Hoffman,
INVENTOR
BY
ATTORNEY.

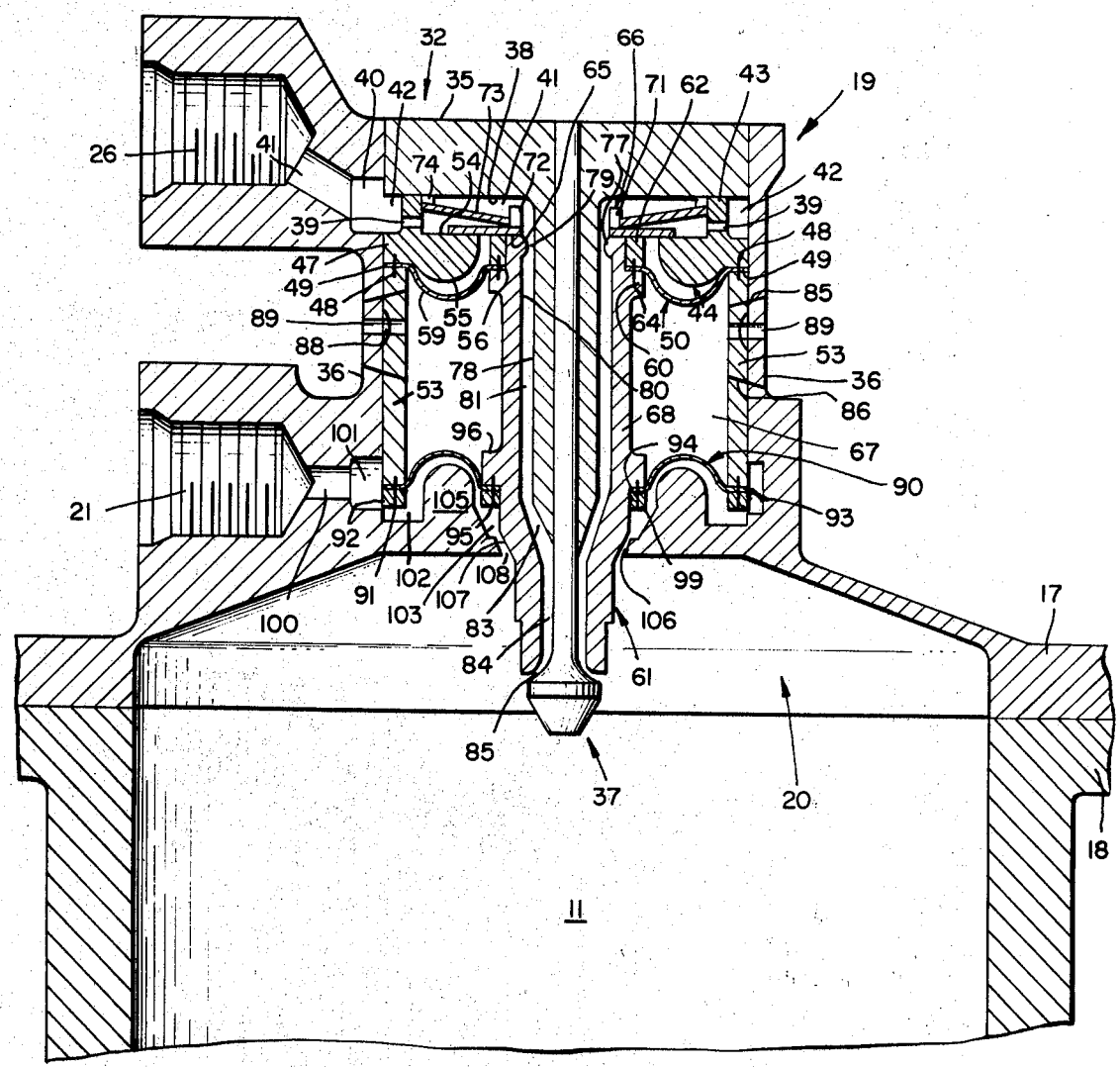

United States Patent Office 3,527,056
Patented Sept. 8, 1970

3,527,056
FLOW POSITIONED INJECTOR
Herbert J. Hoffman, Torrance, Calif., assignor to TRW Inc., Redondo Beach, Calif., a corporation of Ohio
Filed Nov. 20, 1967, Ser. No. 684,128
Int. Cl. F02k 9/02
U.S. Cl. 60—258       4 Claims

ABSTRACT OF THE DISCLOSURE

A bifluid injector being operable by the fluid flow so that essentially constant velocities are maintained for the fluid discharge of the injector over predetermined changes of rates of flow into the injector. The constant injection velocities are made possible by a metering orifice and balanced piston areas in at least one of the flow paths so that as the flow increases, a spring is compressed or moved oppositely to its bias by an increased pressure differential within the injector, causing an injector element, which separates the flow paths of the two fluids, to increase the size of discharge orifices for each of the fluids, thereby preserving constant pressure drop and constant injection velocity at the discharge outlets.

A rocket engine combustion chamber employing an injector as described above.

BACKGROUND OF THE INVENTION

This invention relates to bifluid or bipropellant injectors which may be used in rocket engines as disclosed in U.S. Letters Patent 3,205,565. In the prior art, bipropellant injectors, as used in rocket engines, have been linked mechanically to the throttle control as indicated in the above-identified patent. The use of such mechanical linkage has resulted in excessive complexity and has restricted design flexibility in that only a few arrangements of the rocket engine throttle actuator, throttle valve and injector were possible.

The present invention eliminates the above mechanical linkage to greatly simplify the design of variable thrust rocket engines and their injectors, permitting significant weight reduction. It also provides complete freedom in positioning the throttle valves, reduces the loads on the throttle actuator, and permits the use of multiple injector elements in large throttleable engines.

One advantage of the present invention is to produce a means by which the propellant flow control element can be physically separated from the injector. This separation is desirable in many instances where closely packaged systems are required and it also permits great flexibility of system design which is of great importance and which is paralleled by significant reductions by in cost. Increase in reliability and reduction in weight are also obtained with the present invention over what was possible in the prior art. Further, no external damper is required for use with the present invention.

SUMMARY OF THE INVENTION

The invention is comprised of an improved bifluid injector and of a rocket engine combustion chamber including such an injector. The injector is particularly designed for use with hypergolic bipropellants which flow separately through the injector and are mixed in the combustion chamber.

An object of the invention is to provide an improved injector in which an injector element is positioned by the flow therethrough so that essentially constant injection velocities are maintained over a predetermined range of changes of flow rate of two separated fluids moving into the injector.

Another object of the invention is to provide an injector having seals which combine the function of sealing and flexural suspension by means of a diaphragm permitting longitudinal movement freely, without friction, while providing very rigid lateral support.

A further object of the invention is to provide a bifluid injector in which the quantity of fluid flow therein controls the position of the injector element and the sizes of outlet orifices, depending on said position, so as to provide constant injection velocity independently of changes of flow rate in a predetermined range of flow rates or in a predetermined throttleable range.

A still further object of the invention is to provide an improved bipropellant injector for a throttleable engine.

Another object of the invention is to provide a bifluid injector from which essentially constant injection velocities are discharged over a predetermined range of changes of flow rates into the injector, the maintenance of the constant velocities being accomplished by means of a metering orifice and balanced piston areas arranged so that as the flow into the injector increases, an injector element is moved against the bias of a spring, said movement causing the outlet orifices of the injector to be increased in size, whereby constant pressure drop occurs through the injector and the constant injection velocities are maintained at the outlet orifices.

Further objects and advantages of the invention may be brought out in the following part of the specification wherein small details have been described for the competence of disclosure, without intending to limit the scope of the invention which is set forth in the appended claims.

BRIEF DESCRIPTION OF THE DRAWINGS

Referring to the accompanying drawings, which are for illustrative purposes:

FIG. 2 is a cross-sectional enlarged fragmentary view illustrating the injector and a portion of the combustion chamber shown in FIG. 1;

FIG. 4 is an enlarged view in cross-section showing injector element 61 in an intermediate position.

DESCRIPTION OF THE PREFERRED EMBODIMENT

Figure 1:
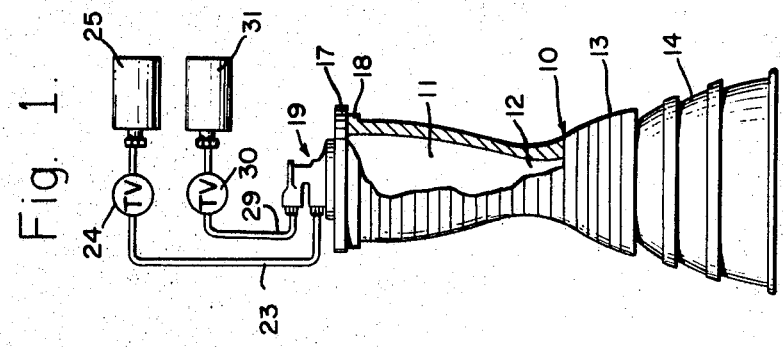
FIG. 1 is an elevational view illustrating a combustion chamber and an injector according to the invention.

Referring again to the drawings, there is shown in FIG. 1 a variable thrust, bipropellant rocket engine having a jet nozzle, generally indicated as 10, comprised of a combustion chamber 11, a throat 12 and an expansion portion 13 to which a skirt 14 is attached for expansion of the combustion gases. The combustion chamber, throat, the expansion portion and the skirt are made in accordance with conventional practice in rocket engine design.

A mounting plate 17 is secured to an annular flange 18 on the combustion chamber and an injector assembly, generally designated as 19, is secured on the plate 17, and as shown in FIG. 2, the discharge end of 20 of the injector extends into the combustion chamber 11. One of the propellants, an oxidizer, is supplied to the injector through an oxidizer inlet 21 through a line 23 having a cavitating venturi throttle valve 24 therein, the source of the oxidizer being the tank 25. Similarly, the other propellant, the fuel, is supplied to the injector through an inlet 26 by means of a line 29 having a cavitating venturi throttle valve 30, the fuel source being a tank 31. The throttle valves and their control assembly, not shown, may be of the type shown in U.S. Letters Patent No. 3,205,656.

The injector 19 is shown in detail in FIG. 2. Its outer end 32 is closed by a cylindrical disc 35, centrally positioned within a main body portion of the injector housing and which is indicated by a substantially cylindrical surface 36. Extending centrally and perpendicular from the disc 35 is a fixed axially directed pintle, generally designated as 37. Extending radially from the base of the pintle is a flat surface 38, forming a wall portion in a fuel path 41 connected through fuel passage portions 39, 40 and 41 to the fuel inlet 26. The portion 40 is connected to an annular passage portion 42, from which fuel flows inwardly through the radially directed passages 39, circumferentially spaced in a cylindrical wall 43 extending upwardly from an annular spacing element 44. The wall 43 is positioned to be in abutment with the surface 38 of the disc 35.

The spacing element 44 has an annular flange 47 which is electron beam welded at 48 to an annular flange 49 of a metallic semitoroidal-shaped seal, generally designated as 50, and an end surface of an inner cylindrical wall 53 of the injector housing. Electron beam welds are continuous and the weld at 48 forms a circumferential seal with the flange 47, the flange 49 and the wall 53. Inwardly of the flange 47 of the spacing element is an annular flat surface 54 and axially below is an approximate semitoroidal convex portion 55, adapted to partially fill the concave part of the seal.

The seal 50 has an internally-directed radial flange 56 and spaced transversely between the two flanges is a semitoroid 59. The two flanges and the semitoroid form a diaphragm-membrane-type seal, made of 17–7 PH CRES having a thickness of from 0.002" to 0.003". The semitoroid portion of the seal is shown in cross section as a full semicircle having its center on a line which would extend from the top surfaces of the flanges 49 and 56.

The flange 56 is electron beam welded at 64 to an annular flange 60 on an injector element or sleeve, generally designated as 61, to a ring 62, and to a base portion 65 of an annular slotted spacer 66, to seal the inlet fuel passage from an annular chamber 67 between the cylindrical wall 53 and a cylindrical wall 68 of the injector element 61. The spacer 66 is L-shaped in cross section and has circumferentially spaced slots at 71 in the vertical portion of the L to permit the flow of fuel therethrough when the upper end 72 is moved into abutment with the surface 38 to perform as a maximum-travel stop when the injector element 61 opens. The base portion 65 of the spacer 66 is shown in a position for maximum closing of the injector outlet, being in contact with the surface 54 of the spacer 44. In this position, it is performing as a minimum-closing stop.

The semitoroidal seal 50, concentric relative to the wall 53 and the injector element, in addition to performing as a seal, supports and guides the injector element 61. The seal, acting as a spring, resists any pressure differential between the injector element and the wall 53 in pure tension while axial deflection is allowed by the rolling of the semitoroidal diaphragm. This results in the capacity of resisting comparatively high pressures while flexing at a very low spring rate. The radial spring rate is extremely high, which is exactly the characteristic desired for the accurate guiding of the injector element 61 while providing very rigid lateral support. The injector element is held in a predetermined position by means of a Belleville spring washer 73 extending between a spring preload shim 74 and the inner upper face of the spacer portion 65.

At the upper inner end of the injector element is a radially inwardly extending annular bead 77, forming a metering orifice 79 in the fuel passage with an external cylindrical surface 78 of the pintle. The annular area of the orifice 79 is determined experimentally. Downwardly of the metering orifice on the injector element is an inner cylindrical surface 80, generally coextensive with the surface 78, between which is formed a portion 81 of the fuel passage. Below the fuel passage portion 81 are fuel passage portions 83 and 84 between the injector and the pintle. Adjacent the bottom of the pintle is an annular fuel outlet slot 85 which is enlarged when the injector element is moved upwardly and which is formed so that the fuel is forced radially outwardly.

The external wall inwardly of the surface 36 is electron beam welded at 85 and 86 to the internal wall 53 to form seals between the upper and lower portions of the injector assembly, and spaced between the walls is an annular passageway 89 which is vented to the atmosphere along with the chamber 67 by means of the ports 89.

At the lower end of the wall 53, there is a seal 90 identical with the seal 50, but inverted, and is electron beam welded at 91 to the wall 53 and a ring 92 through the outer seal flange 93. The inner flange 94 of the seal is electron beam welded at 95 to an annular flange 96 on the injector element and to a ring 99, thereby sealing the chamber 67 from the oxidizer passage which is formed of inlet 21 and passage portions 100, 101, 102 and 103. In the injector housing, there is formed a convex semitoroidal spacer 105 which extends into the concave portion of the seal 90. Radially inwardly from the passage portion 103 is a conical surface 106 opposing conical surface 107 on the exterior of the injector element to form the oxidizer discharge annular orifice 108. The orifice 108, like the orifice 85, is enlarged by the upward movement of the injector element. The orifices 108 and 85 are designed to direct the propellant outwardly therefrom to an impingement and reaction zone radially and axially spaced from the orifices so that the hypergolic propellants can properly mix and burn.

The areas formed by the seals 50 and 90 and the injector and surrounding areas in the flow paths which are in vertical alignment radially outwardly of the metering orifice 79 are substantially balanced, the seals forming a combined sealing and suspension system. The seals are the only supporting members to the injector element and therefore establish the alignment of the latter with respect to the pintle and the injector housing. The propellant fuel patterns are determined by this alignment and therefore there is a critical adjustment. As an example of the gap concentricity tolerances, at a 20-pound thrust level, the fuel gap is approximately 0.0008 inch, and the oxidizer gap is approximately 0.001 inch. The maximum lineal movement of the injector element is approximately 0.10 inch. For a rocket engine where the minimum thrust is 20 pounds and the maximum is 180 pounds, the entire injector assembly, unattached from the flange 17, has a weight of approximately 1.5 pounds.

In operation, the propellant flows are dictated by the cavitating venturi throttle valves to position the injector element 61 to produce essentially constant injection velocities over the throttling range of the engine, for example, between 20 and 180 lbs. thrust. The metering orifices and the balanced piston areas are predetermined so that when the propellant flows increase into the injector assembly, the spring 73 is moved upwardly by the movement of the injector element, the latter resulting from the increased pressure differential, and the injector outlets 85 and 108 are increased in size to preserve constant pressure drop and constant injection velocities at the outlets. The constant pressure drop and constant velocities provide a maximum efficient mixing and burning of the hypergolic propellants. The injector, according to the invention, is found to be extremely stable and has a damping ratio of approximately 0.8 for step changes in thrust. This high damping ratio is achieved with the natural damping of the injector assembly, providing the advantage of eliminating the requirement of an external damper. The response time of the injector is less than 10 microseconds through a throttle range of 5 to 1. The propellants used were hydrazine, $N_2H_4$, and nitrogen tetroxide, $N_2O_4$, as fuel and oxidizer, respectively.

The principle of operation is based upon positioning the movable injector element 61 by means of the propellant flow rates. The actual element position is accomplished by the force balances between the internal pressures and the spring forces of the seals. The propellant flow control devices, such as cavitating venturi, are placed upstream of the injector so that the propellant flow rates are independent of the downstream condition and thus, the pressures within the injector are dependent functions of the flow rates so as to flow position the injector element. The seal assemblies being springs with high spring rates, for example, 400 lbs. per inch for each spring, provide the opposing forces to the internal propellant pressure forces tending to open the injector element. The metering orifice provides a pressure drop at the high thrust levels and this drop is a compensation or trim to the force balance to give the desired injector pressure drops at the maximum thrust level.

Figure 3:
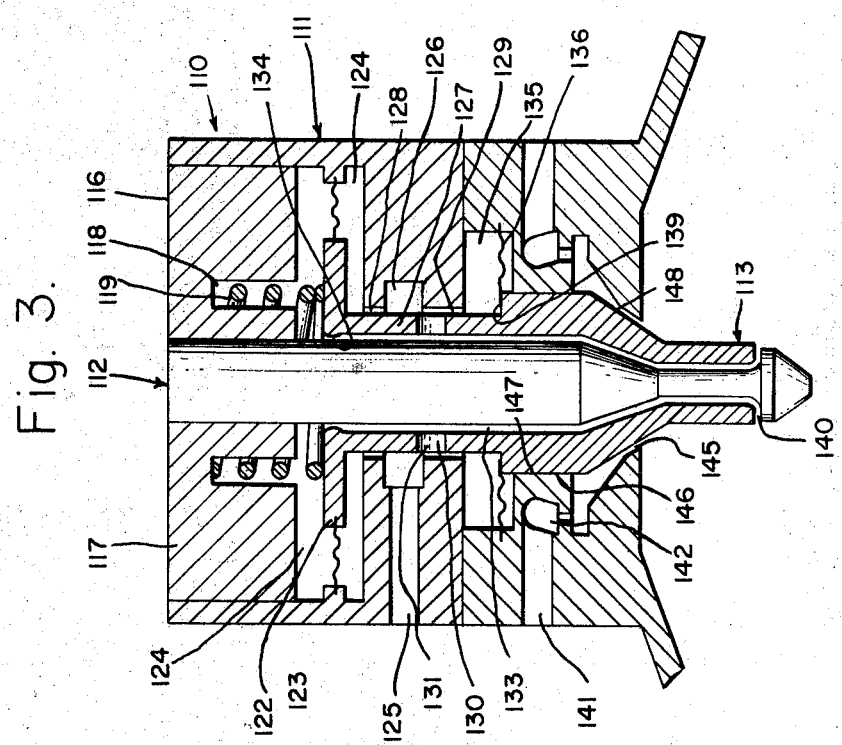
FIG. 3 is a diagrammatic cross-sectional view of another embodiment of an injector according to the invention.

In FIG. 3 there is a diagrammatic view of a flow positioned injector 110 illustrating another embodiment of the invention. The injector is comprised of a housing 111, a fixed pintle 112 and a flow-positioned injector element 113. The upper end of 116 of the injector assembly is sealed closed with a disc 117, the pintle being centrally positioned within the disc. An annular groove 118 contains a coiled spring 19, having one of its ends biased against the base of the groove and having its other end on a flange 122 of the injector element and which forms a portion of a balanced piston area.

The flange 122 is supported within the housing by a bellows-type diaphragm 123, forming a seal in the annular space between the flange and the wall of the housing. The flange 122 is movable axially within the annular space 124. Below the space 124 is a fuel inlet 125, in communication with an annulus 126 surrounding a wall 127 of the injector element. The annulus 126 is in communication with an annular vibration damping orifice 128 to permit fuel flow into the underside of the flange 122 and the seal 123. Extending below the annulus 126 is an annular orifice 129 which permits fuel flow through annularly spaced ports 130 in the wall 127, the orifice 129, the annulus 126 and the ports 130 being positioned so as to form a variable metering orifice, permitting the fuel to flow into a fuel passage portion 133 in accordance with the movement of the injector element which varies the size of the metering orifice at 131.

The fuel in the passage portion 133 is free to move upwardly past a vibration dampening orifice 134, formed by an annular bead, extending radially inwardly of the wall 127 and the pintle 112. By permitting the flow of fuel above and below the flange 122 and the diaphragm seal 123, there is a substantial part of the piston area formed by the latter elements that is balanced.

Fuel pressure is exerted through the orifice 129 downwardly into an annular space 135, sealed by a bellows diaphragm 136, the latter being secured to the injector element at a piston forming portion 139. The diaphragm 136 seals the fuel within the injector from the oxidizer passages. The fuel flows out of the injector through an annular orifice 140 which is increased in size when the injector element 113 is moved upwardly.

An oxidizer inlet 141 extends inwardly into the housing and terminates in an annular passage 142 which is in communication with the oxidzer outlet orfice 145. The orifices 140 and 145 are of the same type as orifices 85 and 108 in FIG. 2 and operate in the same manner.

The diaphragms 123 and 136 do not provide guidance for the injector element equivalent to that provided by the semitoroidal diaphragms 50 and 90 in FIG. 2 and therefore the injector element is made to have an exterior cylindrical surface 146 in slidable engagement with an interior housing surface 147 for guidance.

Inwardly of the orifice 145 is a conical piston area 148 which is somewhat in balance with the piston area 139 acted upon by the fuel. As the pressure is exerted within the fuel and oxidizer inlet the fuel, moving upwardly through the orifice 128, opens the outlet orifice by the movement of the pistons formed by flange 122 and the diaphragm 123 and at the same time increases the size of the variable metering orifice 131 so as to permit more flow out of the fuel outlet 140 which has been opened. A decrease in fuel pressure permits the spring 118 to tend to close the outlet orifices and also to decrease the size of the variable metering orifice 131.

The variable metering orifice, providing linear pressure drop, permits a more nearly constant injection velocity to be obtained, versus flow rate, than that obtained with the fixed orifice as shown in FIG. 2. Pressure drop in a fixed orifice is not linear but varies with the velocity squared. As a result of this nonlinear pressure drop the plot of injection velocity versus flow rate shows a decrease in velocity in the central flow rate area while regaining the desired velocity at the minimum and maximum flow positions. The more nearly constant injection velocity produces higher efficiency in the combustion process.

I claim:

1. A bifluid flow positioned inector comprising:
   (a) an injector housing;
   (b) two separate flow paths within said housing, each having an inlet into said housing and a discharge outlet from said housing;
   (c) walls forming a part of each of said flow paths being on a movable injector element;
   (d) said outlets being variable in size by movement of said injector element;
   (e) means operable in said housing for utilizing the quantity of flow into at least one of said paths to control the position of the injector element and maintain substantially constant velocity flow out of said paths independently of changes of rates of flow out of said paths indepedetly of changes of rates of flow for a predetermined range of said rates of flow into said paths;
   (f) said means further including metering orifice means in one of said flow paths;
   (g) balance piston means on said injector element in one of said flow paths;
   (h) biasing means operable to restrain movements of said injector element against said flow;
   (i) said biasing means being movable by flow pressure on said piston means to move said injector element and increase the outlet sizes so as to permit substantially constant pressure drop through said outlets, said biasing means including means to support said injector element within said housing and to form seals to separate said flow paths, said biasing means permitting longitudinal movement of said injector elements while providing rigid lateral support for said injector element relative to said housing, said biasing means comprising an annular diaphragm extending in an annular space between said injector elements and said housing, said diaphragm further being a substantial semitoroid having flanges at its inner and outer edges, said flanges extending radially away from said semitoroid so as to be transverse to the longitudinal direction, the outer of said flanges beng attached to said housing and the inner of said flanges being attached to said injector element, 2. A bifluid flow positioned injector comprising:
   (a) an injector housing;
   (b) an injector element suported for movement within said housing;
   (c) a central element fixedly supported within said housing and extending within said injector element;
   (d) a first passage formed between said injector element and said central element;
   (e) said first passage having an inlet into said housing and having a variable-size outlet formed by said central element and said injector element;
   (f) a second passage formed between a housing wall and said injector element;
   (g) said second passage having an inlet into said housing and having a variable-size outlet formed by a housing wall portion and said injector element;

(h) said injector element being movable in one direction for simultaneously increasing the sizes of said outlets and in the opposite direction for simultaneously decreasing the sizes of said outlets;

(i) means including a first seal operable in said housing for utilizing the quantity of flow into at least said first passage to control the position of the injector element and maintain substantially constant velocity flow out of said outlets independently of changes of rates of flow for a predetermined range of said rates of flow into said passages;

(j) said last named means comprising a metering orifice in said first passage, substantially balanced piston areas on said injector element in said first passage;

(k) biasing means biasing said injector element toward a position to decrease the sizes of said outlets;

(l) said injector element being movable by increased flow pressure on said piston areas to move said injector element and increase the outlet sizes whereby to permit substantially constant pressure drop across said outlets;

(m) said seal comprising substantially semitoroid having annular flanges on the inner and outer edges;

(n) said flanges extending radially away from the semitoroid so as to be transversed to the longitudinal direction;

(o) said injector element being generally cylindrical and said seal being positioned in an annular space around said injector element.

3. A bifluid flow positioned injector comprising:
(a) an injector housing;
(b) an injector element supported for movement within said housing;
(c) a central element fixedly supported within said housing and extending within said injector element;
(d) a first passage formed between said injector element and said central element;
(e) said first passage having an inlet into said housing and having a variable-size outlet formed by said central element and said injector element;
(f) a second passage formed between a housing wall and said injector element;
(g) said second passage having an inlet into said housing and having a variable-size outlet formed by a housing wall portion and said injector element;
(h) said injector element being movable in one direction for simultaneously decreasing the sizes of said of said outlets;
(i) a metering orifice in said first passage;
(j) balanced piston areas on said injector element in said first passage; and
(k) a spring biasing said injector element against movement to increase the sizes of said outlets;
(l) said spring being movable by flow pressure on portions of said piston areas to move said injector element and increase the outlet sizes so as to permit substantially constant pressure drop and substantially constant flow velocity through said outlets independently of changes of rates of flow for a predetermined range of said rates of flow into said passages, said seals being substantially semitoroids having annular flanges on the inner and outer edges, said flange extending radially away from the semitoroid so as to be transverse to the longitudinal direction, said outer flange being secured to said housing and said inner flange being secured to said injector element, said injector element being substantially cylindrical and said seals being positioned in an annular position around said injector element.

4. A variable thrust bipropellant rocket engine comprising:
(a) a combustion chamber;
(b) an injector housing having a longitudinal cavity therein;
(c) a pintle extending in a longitudinal direction and attached to said housing;
(d) an injector element surrounding said pintle and adapted to move in a longitudinal direction, said injector element forming an annular orifice with said pintle and a second annular orifice with said pintle and a second annular orifice with said housing for introduction of propellants into said combustion chamber;
(e) biasing means adapted to force said injector element longitudinally whereby to decrease the sizes of said orifices, piston means on said injector element, a third orifice on said injector element, means to introduce said propellant through said third orifice, said orifice being adapted to allow propellant pressure on one side of said piston means whereby to bias said injector element in a direction to decrease the size of said first and second orifice, a fourth orifice in said housing adapted to expose the other side of said piston to propellant pressure prior to passing through said third orifice;
(f) whereby as propellant pressure increases said injector element will move in a direction to increase the sizes of said first and second orifices.

References Cited

UNITED STATES PATENTS

| | | | |
|---|---|---|---|
| 2,995,008 | 8/1961 | Fox | 60—240 |
| 3,234,731 | 2/1966 | Dermody | 60—258 |
| 3,344,605 | 10/1967 | Mageean | 60—39.74 |

DOUGLAS HART, Primary Examiner

U.S. Cl. X.R.

60—240, 39.27, 39.74; 239—410